Feb. 6, 1968   G. DANKOWSKI   3,367,199
PULLEY AND BEARING ASSEMBLY
Filed May 25, 1966

GERHARD DANKOWSKI
INVENTOR.

BY *Herbert J. Brown*

ATTORNEY

United States Patent Office 3,367,199
Patented Feb. 6, 1968

3,367,199
PULLEY AND BEARING ASSEMBLY
Gerhard Dankowski, 8228 Hunnicut Road,
Dallas, Tex. 75228
Filed May 25, 1966, Ser. No. 552,786
1 Claim. (Cl. 74—230.3)

This invention relates to pulleys and has reference to means mounting bearings therein.

Pulleys, in most operations, generate heat, particularly idle pulleys which rotate about stationary shafts. The generated heat causes the material of the pulley to expand in all directions. The circumferential expansion is greater than the radial expansion; thus, the hub opening receiving the bearing increases in diameter with the result that the bearing becomes loose. Expansion is greater in cast pulleys than those turned from good quality steel, but the former are much less expensive when produced in quantity.

An object of the invention is to provide a pulley construction wherein heat generated in the pulley will cause the same to tighten and grip the bearing instead of loosening it.

Another object is to provide a pulley construction which will wear longer than ordinary cast pulleys because the bearings will not run lose in their hubs.

A further object is to provide a pulley construction which, in addition to the foregoing objects, may be made of inexpensive materials.

These and other objects of the invention will become apparent from the following description and the accompanying drawing, in which.

Figure 1:
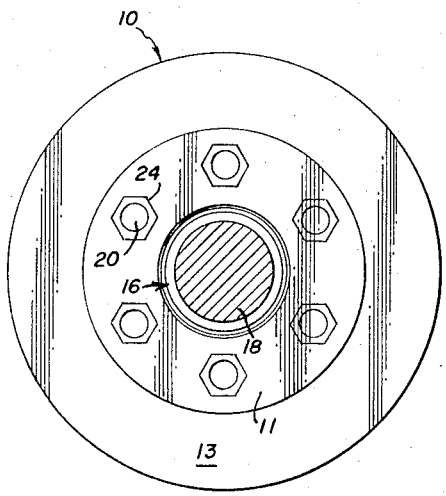
FIGURE 1 is a side elevational view of a pulley in accordance with the invention mounted on a shaft which is shown in cross section.
Figure 2:
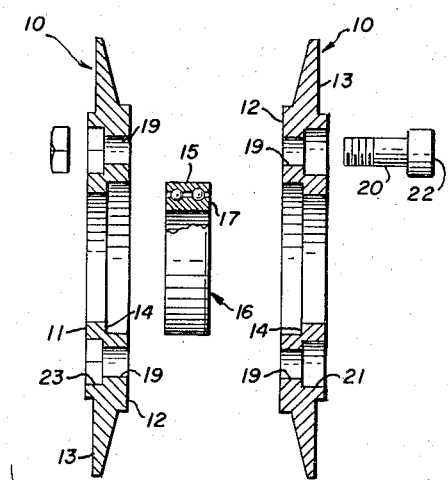
FIGURE 2 is an exploded transverse center sectional view of the pulley illustrated in FIGURE 1 and showing the bearing in broken elevation.
Figures 3, 4:
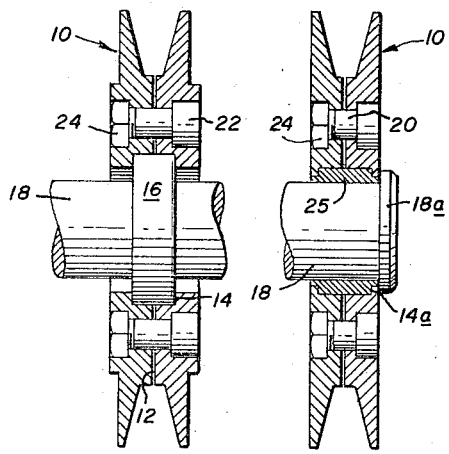
FIGURE 3 is a sectional view similar to FIGURE 2 but showing the pulley assembled and mounted on a shaft.
FIGURE 4 is a view similar to FIGURE 3 and shows a modified form of the invention wherein a journal bearing is used instead of a roller bearing.

The pulley in the form of the invention illustrated in FIGURES 1–3 includes circular halves, herein referred to as disc members 10, and each disc member is comprised of a hub portion 11, a body portion 12 and a flange 13 therearound. The inner faces of the flanges 13 are beveled to engage the sides of V-belts, not shown. Preferably, the disc members 10 are cast or die cast of metal, for example, aluminum. However, the material of the members 10 may be of material other than metal, for example, molded synthetic resin.

The inner peripheries of the hubs portions 11 are recessed and shouldered at 14 to receive the diameters and ends of the outer race 15 of a ball bearing 16. The inner race 17 of the ball bearing 16 receives a shaft 18.

The body portions 12 have at least 3 matching cylindrical openings 19 for receiving socket type steel cap screws 20. The outer ends of the openings 19 in one disc member 10 have circular recesses 21 to receive the heads 22 of the screws 20, whereas the outer ends of the other openings have hexagonal recesses 23 to receive nuts 24 threaded on the screws. In assembly the depths of the shouldered recesses 14 are such, relative to the width of the bearing 16, that the two disc members 10 do not touch even though the screws 20 are tight.

The form of the invention illustrated in FIGURE 4 is substantially like the foregoing and like parts have the same reference numerals to avoid unnecessary repetition of description. In this form of the invention a journal bearing 25 is employed instead of the roller bearing 16. The journal bearing 25 is as wide as the assembled disc members 10 and is shouldered, not numbered, around its end peripheries so as to be received in and engaged by shouldered recesses 14a in the inner surfaces of the hub portions 11. In FIGURE 4 the shaft 18 is shown to have a shoulder 18a for locating the pulley assembly. As before, the depths of the shouldered recesses 14a relative to the width of the shouldered journal bearing 25 are such that the disc members 10 do not touch in assembly.

Figure 5:
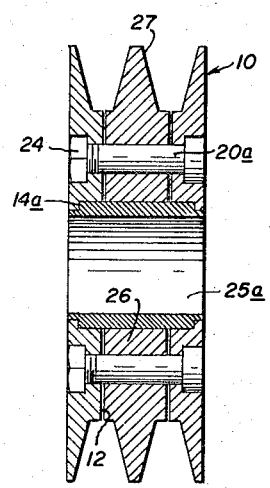
FIGURE 5 is a sectional view similar to FIGURES 3 and 4 but showing a pulley construction according to the invention for use with multiple belts.

The form of the invention illustrated in FIGURE 5 includes the described disc members 10 and additionally includes an intermediate disc member 26 therebetween. The intermediate disc member 26 has a centrally located flange 27, the sides of which are beveled in the same manner as the flanges 13 of the first described disc members 10. A shouldered journal bearing 25a is like the first described journal bearing 25, but is of a width to extend to the outer surfaces of the outer disc members 10. The steel screws 20a are of lengths to accommodate the additional width of the intermediate disc member 26. As in FIGURE 4, the shouldered recesses 14a engage the shoulders of the journal bearing 25a. The intermediate disc member 26 is preferably a press fit around the center of the bearing 25a, and the width of the intermediate disc member is such that it does not touch the outer disc members 10 in assembly.

In view of the foregoing it will be apparent in all described forms of the invention that longitudinal expansion of the steel screws 20, 20a due to heat is less than the transverse expansion of the disc members 10. Thus, by reason of the engagement of the screw heads 22 and nuts 24 with outer areas of the disc members 10, expansion of the latter is necessarily inwardly with the result that the shoulders of the hub portion recesses 14, 14a tighten against the outer race 15 of the roller bearing 16, and against the shoulders of the journal bearing 25 or 25a.

The invention is not limited to the exemplary constructions herein shown and described, but may be made in various ways within the scope of the appended claim.

What is claimed is:

1. A pulley comprised of at least two disc members in side by side axial relation, each said disc member being comprised of a circular body portion, a flange therearound and a hub portion, said disc members being of a material having a coefficient of expansion greater than steel, shouldered recesses in opposing faces of said hub portions, bearings received in and engaged by said shouldered recesses and transverse steel screws through said disc members securing the same together.

References Cited

UNITED STATES PATENTS

| | | | |
|---|---|---|---|
| 1,897,329 | 2/1933 | Ostrander | 74—230.3 XR |
| 1,903,776 | 4/1933 | Clark et al. | 74—230.3 |
| 2,137,987 | 11/1938 | Smith | 74—230.7 |
| 2,669,878 | 2/1954 | Nelson | 74—230.3 |
| 2,852,949 | 9/1958 | Arthur | 74—230.3 |
| 3,111,856 | 11/1963 | Backofen | 74—230.3 |

FRED C. MATTERN, JR., *Primary Examiner.*

J. A. WONG, *Assistant Examiner.*